United States Patent [19]

Varnham

[11] Patent Number: 5,131,749
[45] Date of Patent: Jul. 21, 1992

[54] REDUCTION OF DEMODULATOR OFFSET ERRORS IN FIBRE-OPTIC GYROSCOPES

[75] Inventor: Malcolm P. Varnham, Stevenage, United Kingdom

[73] Assignee: British Aerospace Public Limited Company, London, England

[21] Appl. No.: 803,784

[22] Filed: Dec. 6, 1991

Related U.S. Application Data

[63] Continuation of Ser. No. 688,720, Apr. 23, 1991, abandoned, which is a continuation of Ser. No. 581,406, Sep. 13, 1990, abandoned, which is a continuation of Ser. No. 323,913, Mar. 15, 1989, abandoned.

[51] Int. Cl.⁵ .............................................. G01C 19/72
[52] U.S. Cl. ...................................................... 356/350
[58] Field of Search ......................................... 356/350

[56] References Cited

U.S. PATENT DOCUMENTS

| | | | |
|---|---|---|---|
| 4,705,399 | 11/1987 | Grandorge et al. | 356/350 |
| 4,707,136 | 11/1987 | Kim | 356/350 |
| 4,836,676 | 6/1989 | Kim et al. | 356/350 |

FOREIGN PATENT DOCUMENTS

| | | | |
|---|---|---|---|
| 2108652 | 5/1983 | United Kingdom | 356/350 |
| 2134248 | 8/1984 | United Kingdom | 356/350 |
| 2178162 | 2/1987 | United Kingdom | 356/350 |

Primary Examiner—Samuel A. Turner
Attorney, Agent, or Firm—Cushman, Darby & Cushman

[57] ABSTRACT

A fibre optic gyroscope which reduces the sensitivity of the gyroscope to offsets in the demodulator, the reduction in sensitivity being achieved by modulating the radiation passing through the gyroscope by a first waveform which is derived from second and third periodic waveforms, the third waveform having a frequency substantially less than that of the second waveform in use and the second waveform having a frequency of about $\frac{1}{2}T$ where T is the time taken for the radiation to travel through the gyroscope, and detecting said radiation which is subsequently demodulated with respect to both second and third waveforms in order to minimize any offset introduced by the demodulation with respect to the second waveform.

11 Claims, 4 Drawing Sheets

Fig. 2.
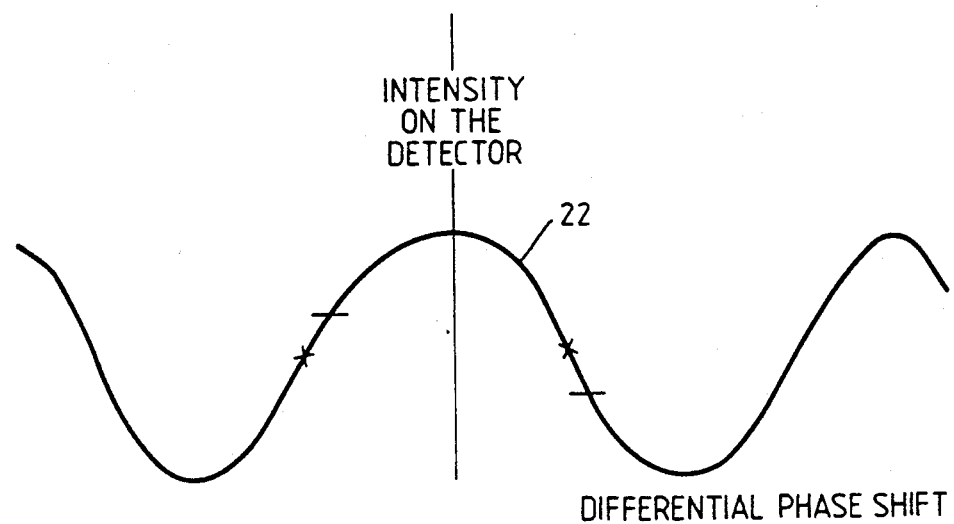
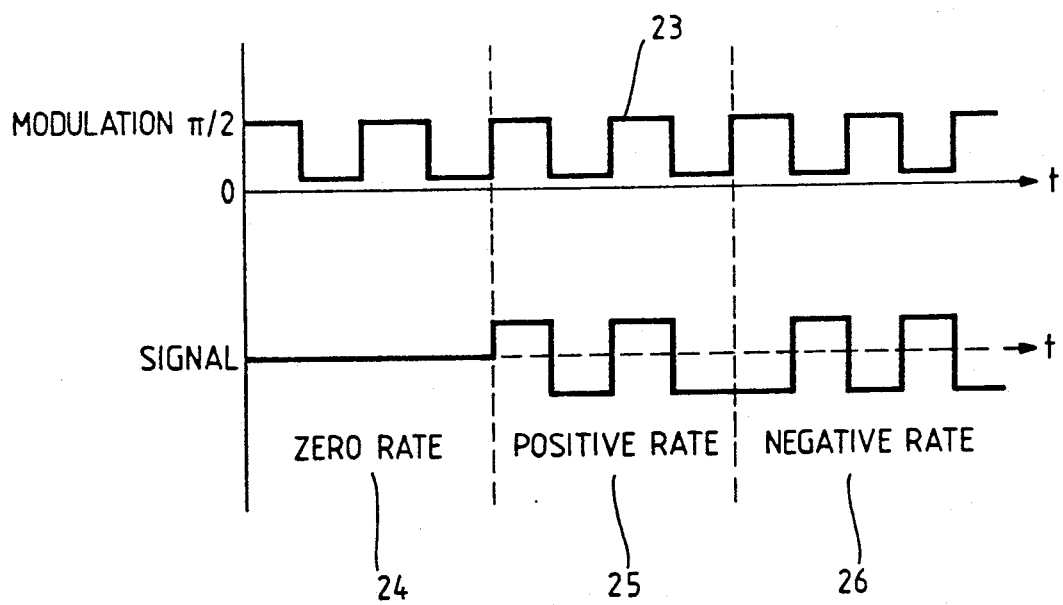

REDUCTION OF DEMODULATOR OFFSET ERRORS IN FIBRE-OPTIC GYROSCOPES

This is a continuation of application Ser. No. 07/688,720, filed on Apr. 23, 1991 which was abandoned upon the filing hereof; which is a continuation of 07/581,406 filed Sept. 13, 1990, now abandoned, continuation of 07/323,913 filed Mar. 15, 1989, now abandoned.

This invention relates to fibre-optic gyroscopes.

It is well known for fibre-optic gyroscopes to be designed to comprise a light source, beam splitters, a coil, phase modulators and an electronics unit. Generally the electronics unit includes a demodulator which demodulates the signal produced by the detected light in order that a signal may be derived which is dependent upon the non-reciprocity in the interferometer.

There are many different fibre-optic gyroscope arrangements including open and closed loop schemes with a variety of modulation and demodulation techniques. In the closed loop schemes the signal from the demodulator is used to null the non-reciprocity "seen" by the demodulator to zero. In the open loop schemes, any non-reciprocal phase induced by rotation of the coil is not nulled but simply measured by monitoring the demodulator output. A limiting factor in all these arrangements is the apparent rotation rate (drift) caused by offsets in the demodulator. This drift can be reduced by increasing the gain in front of the demodulator, however there are practical limits such as saturation of the amplifier and demodulator. The difficulties are further increased since the rate of demodulation is typically in the range of 100 KHz to 10 MHz. These frequencies are high and consequently it is difficult to design the demodulator to have a sufficiently low offset voltage.

Accordingly one object of the present invention is to provide a system which reduces the sensitivity of the gyro to offsets in the demodulator.

According to one aspect of the present invention there is provided a fibre-optic gyroscope comprising a coil of optical fibre, a light source and a light detector coupled to the coil via phase modulating means and beam splitting/combining means for light from the source to pass in opposite directions around the coil and then to be combined and passed to the detector, demodulation means connected to the output of detector for forming an electrical signal representative of the amount of non-reciprocal phase shift undergone by said light while passing through the coil; and signal generating means connected to said phase modulation means for modulating the phase of said light according to a modulation waveform which comprises a periodic waveform having a frequency f of about $\frac{1}{2}T$, where T is the time taken for the light to traverse the coil, the waveform being periodically inverted in phase at a frequency substantially less than f.

According to a second aspect of the present invention there is provided a fibre optic gyroscope in which radiation passing through said gyroscope is modulated by a first waveform which is derived from second and third periodic waveforms. the third having a frequency substantially less than that of the second in use; the frequency f of the second waveform is about $\frac{1}{2}T$ where T is the time taken for the radiation to travel through the gyroscope;

further in which said radiation is detected and subsequently demodulated with respect to both first and second waveforms in order to minimise any offset introduced by the first demodulation.

Reference will now be made by way of example to the accompanying diagrams in which:

FIG. 2 is a diagram of the interference fringe modulating waveforms and detector signals for zero negative and positive base imbalances for the FIG. 1 system;

Figure 1:
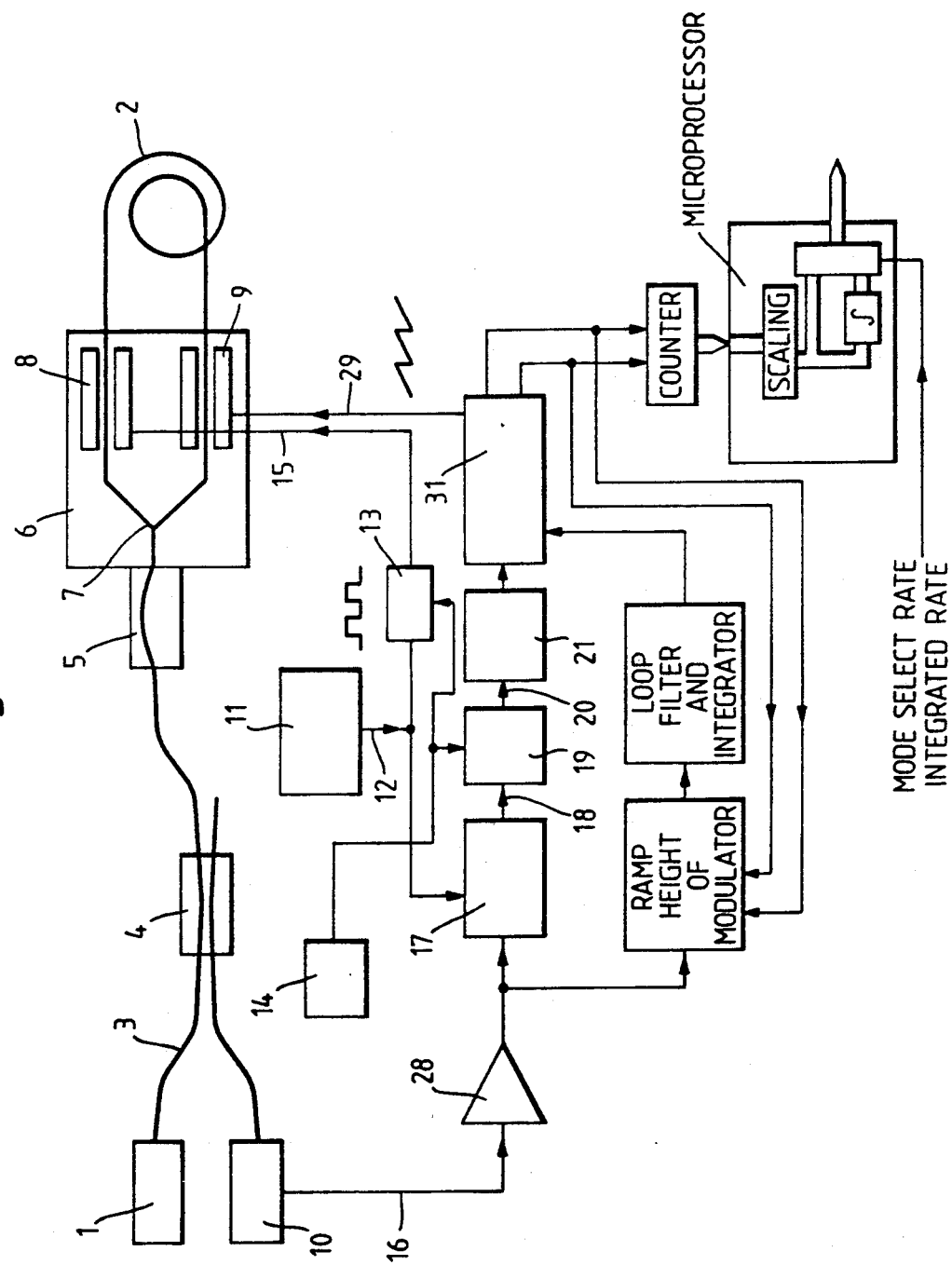
FIG. 1 is a block diagram of a fibre-optic gyroscope system scheme utilising a double demodulation process according to a first embodiment of the present invention.

In FIG. 1 of the accompanying drawings, light from an edge-emitting light emitting diode (ELED) source 1 is passed to an optic fibre coil 2 via optic fibre 3, a fibre optic coupler 4, polariser 5, an integrated optics coupler (Y-junction) 7 and two phase modulators 8 and 9. The light is split into two beams at the coupler 7, which beams pass via respective ones of the modulators 8 and 9, then in respective opposite directions around coil 2, and then back to the coupler 7 where they recombine and where interference takes place. The recombined beams are then passed back to a detector 10 via the polariser 5 and fibre-optic coupler 4. As variations of what is shown in FIG. 1, the integrated optics device 6 could comprise only the modulators 8 and 9, the coupler 7 being then implemented as a separate discrete component between the device 6 and the polariser 5. Alternatively it could incorporate the modulators 8 and 9 and the coupler 7 and in addition one or both of the polariser 5 and coupler 6. In the case of a III-V semiconductor integrated optic device, the device could even incorporate the source and the detector.

The fibre coupler 4 may be a fused biconical-taper coupler made from conventional fibre. The polariser 5 may be based on a glass/metal design and may comprise a monomode fibre core, near to which is placed Indium Gallium in a D-Shaped hole within the fibre substrate. The integrated optics may be made from Lithium Niobate and may have two phase modulator sections. A high-birefringence fibre may be used in the coil which is 200 m long. The integrated optics may be polarisation maintaining.

Similar gyros may also be constructed with a coil made from a depolariser and conventional fibre.

The phase imbalance in the gyro between the counterpropagating waves is measured by modulating the phase of the light in the coil with a signal 15, in a manner which will be explained below. FIG. 2 shows a diagram of the interference fringe 22, the modulating waveform 23 and the detector signals for zero, negative and positive phase imbalances 24, 25 and 26 respectively in the absence of a chopper signal 14A (whose function will become apparent below). The resulting signal on the detector 10 has a component at the modulation frequency which for small errors is proportional to the phase imbalance around the coil.

Figure 3:
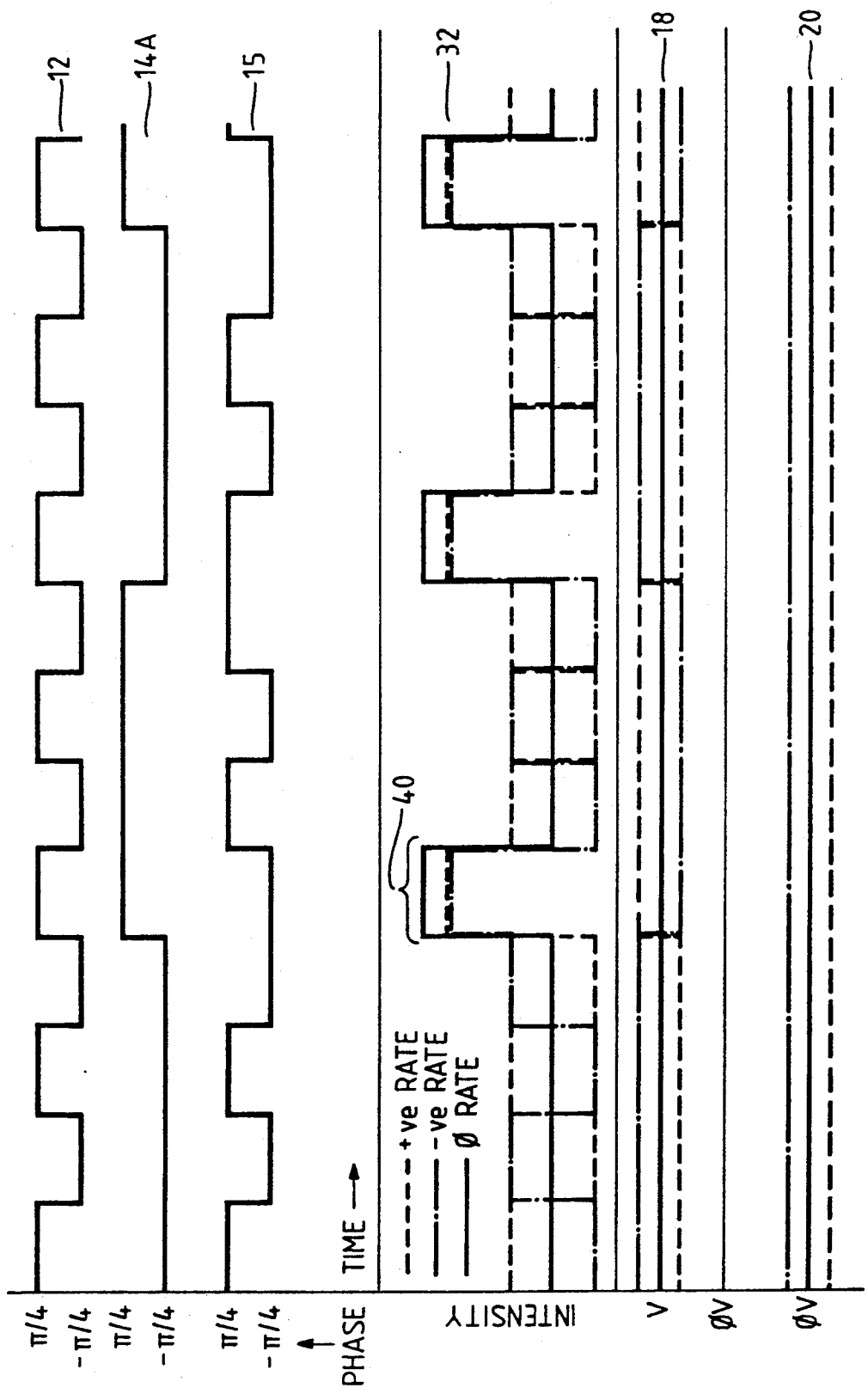
FIG. 3 is a number of graphs of typical signals in the system of FIG. 1.

The phase modulator 8 is driven by a square wave signal 12 from a generator 11, the signal having a frequency $\frac{1}{2}T$, where T is the time taken for light to pass around coil 2, and having an amplitude such as to produce a phase shift of plus and minus $\pi/4$ of the light passing through the modulator, the signal 12 is then passed into a phase inverter 13. The signal 12 is inverted in phase synchronously with a chopper 14 whose signal 14A has a frequency lower than that of signal 12. The resultant signal 15 and signals 12 and 14A are shown in FIG. 3. The signal is passed into modulator 8 in the gyro optics 6 of the system.

The detector output signal 16 is demodulated by a rate demodulator 17 in a known manner.

The signal 18 from the rate demodulator generally contains a wave signal whose amplitude is a measure of any non-reciprocity occurring in the gyroscope and a relatively high DC offset of which a part, at least, will be due to the offsets in the rate demodulator. The signal is shown for zero, negative and positive rotation rates of the gyroscope in FIG. 3. Signal 18 is then demodulated at the lower chop frequency (as generated by the chopper 14) by a second demodulator 19. Since demodulator 19 is operating at a lower frequency it can be designed to have a relatively smaller DC offset than that of demodulator 17, but without seriously increasing the cost of its production. Hence the output 20 from demodulator 19 will have smaller offset. FIG. 3 shows a typical signal 20 for zero, negative and positive, rotation rates of the gyroscope. This signal 20 may then be introduced via suitable filter means 21 to a serrodyne voltage controlled oscillator (VCO) 31. This then generates a sawtooth signal 29 whose slope varies in order to adjust any phase imbalance adjusts until this phase imbalance around the coil is nulled. The amplitude of the serrodyne is controlled to $2\pi$ where $\pi$ is an integer.

The rate and amplitude contol loops 30 control the slope of the serrodyne signal 29 and its height. Consequently the frequency of the signal is proportional to rate and the gyroscope output can be obtained by summing the number of positive and negative resets in the VCO. These are counted, scaled, and output to the user as either incremental angle or rate.

The output of the gyro is the frequency of the serrodyne VCO which is ideally linearly proportional to rotation rate (note negative frequencies are defined as having a negative sawtooth slope, whereas positive frequencies have a positive slope).

The detector waveform 16 includes a periodic signal 32 as shown in FIG. 3 which is produced when the chopper inverts the phase signal 12. The amplitude of the signal is an indication of the power on the detector and can be used in a feedback loop to adjust either the gain of amplifier 28 or the source power to maintain a constant output level. It should be noted that demodulation is inhibited during period 40 in any known manner.

Figure 4:
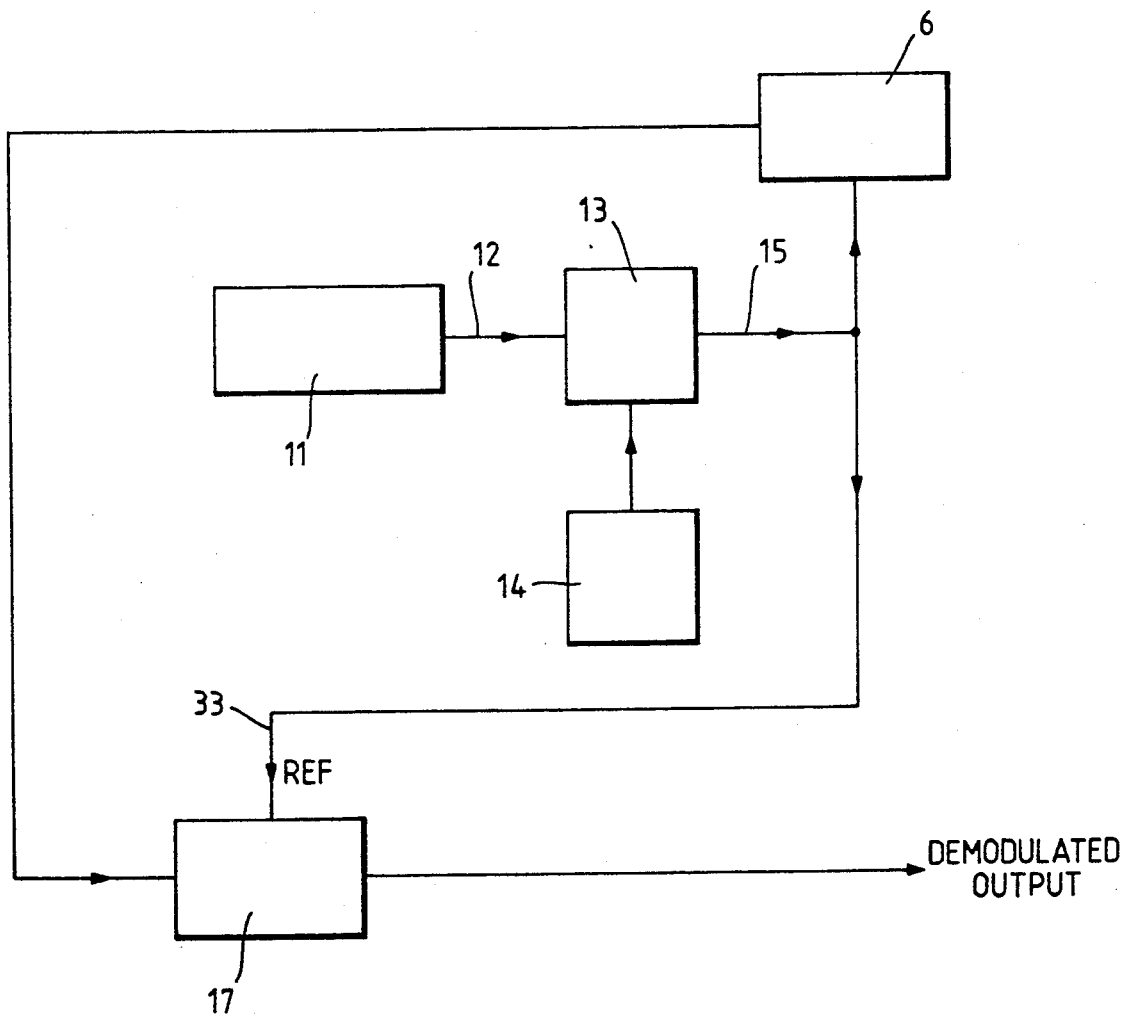
FIG. 4 is a block diagram of a gyroscope utilising a double demodulation process according to a second embodiment of the invention.

A second embodiment of the invention shown in FIG. 4, is a simplification of the first embodiment because the phase of the signal 12 is varied synchronously with the chopper signal 14A, but so is a reference signal 33 to the rate demodulator 17.

This second embodiment may not work as well as the first and is thus not the prefered embodiment.

There are many variations on the above first embodiment. For example, the rate demodulator output can be amplified and then a.c. coupled. This has the advantage that the amplification before the second demodulator will reduce the effects of offsets arising from the first demodulator without the penalties of saturation, because of the reduced bandwidth of the signals at the rate demodulator output. In addition, the a.c. coupling may help the second demodulator to reject the unwanted DC components from the first demodulator by ensuring that the input to the second demodulator has an average value of exactly zero.

The double demodulation process can be implemented digitally if an analogue to digital converter is placed in front of the first demodualtor. Alternatively, an analogue to digital converter could be placed in front of the second demodulator. In the latter case, the first demodulation would be carried out using analogue electronics, while the second demodulation would be carried out using digital electronics.

The double demodulation process would be applicable to both closed and open loop schemes where the gyro is modulated. The additional modulation signal 14A could be at a fixed frequency, variable frequency pseudo-random frequency or random frequency. The primary modulating waveform applied to the gyro (signal 15) could be square, sinusoidal or any other shape.

It should be noted that the first described embodiment is the preferred embodiment but not the only embodiment.

We claim:

1. A fibre-optic gyroscope comprising:
    a light source;
    a coil of optical fibre, connected to the light source for receiving light therefrom;
    beam splitting/combining means for splitting light from the light source and directing it in opposite directions around the coil and then combining said light;
    phase modulation means for modulating the phase of the light in the coil in accordance with a combined signal produced by combining a first signal at a first frequency with a second chopper signal at a frequency lower than the first frequency so as to produce a phase shift in the light passing through the coil;
    a light detector for detecting the combined light passing from said coil and for producing an output signal;
    a first rate demodulator for demodulating the output from the light detector so as to produce an output signal whose amplitude is a measure of the non-reciprocity occurring in the gyro as well as a dc signal of which part will be due to the offsets in the first rate demodulator;
    second demodulation means for demodulating the output signal from the first demodulator at a frequency lower than the frequency at which the first demodulator operates so as to produce a signal whose amplitude is substantially unaffected by any dc signal due to the offsets in the second demodulator and is substantially a measure of the non-reciprocity occurring in the gyro.

2. A fibre-optic gyroscope as claimed in claim 1 in which the first signal has a frequency of $\frac{1}{2}T$, where T is the time taken for light to pass around the coil, and has an amplitude such as to produce a phase shift of plus and minus $\pi/4$ of the light passing through the modulator.

3. A fibre-optic gyroscope as claimed in claim 1 including inversion means for inverting the first signal in phase synchronously with the second, chopper, signal.

4. A fibre-optic gyroscope as claimed in claim 1 including a serrodyne voltage controller oscillator (VCO) for receiving an output signal from the second demodulation means and for generating a nulling signal to null the non-reciprocity in the gyro induced by rotation.

5. A fibre-optic gyroscope as claimed in claim 1 including a serrodyne voltage controller oscillator (VCO) for receiving an output signal from the second demodulation means and for generating a nulling signal to null the non-reciprocity in the gyro induced by rotation and in which the nulling signal is a serrodyne having a sawtooth waveform and amplitude of substantially 2 mpi, where m is the integer.

6. A fibre-optic gyroscope as claimed in claim 1 including a serrodyne voltage controller oscillator (VCO) for receiving an output signal from the second demodulation means and for generating a nulling signal to null the non-reciprocity in the gyro induced by rotation, the nulling signal being a serrodyne having a sawtooth waveform and amplitude of substantially 2 mpi, where m is the integer, and means for controlling the amplitude of the serrodyne waveform which is obtained from error pulses which occur synchronously with resets of the serrodyne.

7. A fibre-optic gyroscope as claimed in claim 6 including deriving means for deriving an error signal to correct the serrodyne amplitude by synchronous demodulation of the detector signal using reference signals derived by both dither and chopper waveforms.

8. A fibre-optic gyroscope as claimed in claim 1 in which the first and second demodulators are ac coupled.

9. A fibre-optic gyroscope as claimed in claim 1 including a gain between the first and second demodulation means.

10. A fibre-optic gyroscope as claimed in claim 1 in which the first and/or second demodulators implement demodulation digitally.

11. A fibre-optic gyroscope as claimed in claim 1 including a sample and hold device and a narrow band filter prior to the second demodulator.

* * * * *